Patented Oct. 6, 1925.

1,556,037

UNITED STATES PATENT OFFICE.

JAMES W. SCHWAB, OF GULF, TEXAS, ASSIGNOR TO TEXAS GULF SULPHUR COMPANY, OF BAY CITY, TEXAS, A CORPORATION OF TEXAS.

FREE-BURNING SULPHUR.

No Drawing. Application filed August 18, 1923. Serial No. 658,044.

*To all whom it may concern:*

Be it known that I, JAMES W. SCHWAB, a citizen of the United States, residing at Gulf, in the county of Matagorda, State of Texas, have invented certain new and useful Improvements in Free-Burning Sulphur; and I do hereby declare the following to be a full, clear, and exact description of the invention, such as will enable others skilled in the art to which it appertains to make and use the same.

This invention relates to the treatment of free or elementary sulphur including crude mined sulphur, and has among its objects the elimination of the difficulties which arise in the burning of sulphur particularly of crude sulphur containing oily impurities.

The present invention may be employed with advantage wherever and whenever it is desired to burn any sort or kind of combustible product containing sulphur when the combustion is carried out under such conditions that hot molten sulphur is likely to come into contact with an oil or an oily substance at an elevated temperature, but it is designed particularly to be used in connection with the burning of ordinary crude mined sulphur containing oily impurities to produce sulphur dioxide for use in various industrial operations. The invention also has various other uses which will readily suggest themselves to those skilled in the art concerned.

It is known that even very small amounts of oily impurities such as mineral oils in sulphur greatly affect the burning qualities of the sulphur even tho the sulphur be of a very high purity in other respects and this effect on the burning properties is known to be due to the formation of a protective oily film or layer which forms over the surface of the molten sulphur while it is burning thus partially or wholly excluding access of the oxygen of the air to the sulphur. This oily substance or protective layer of oil is thought to consist of a product resulting from a chemical or physical action of some sort between the oil and the sulphur. This product resembles asphalt and its physical and other properties are such as to cause it to form an exceptionally adherent film or layer over the surface of molten sulphur.

Various means have hitherto been employed or proposed for overcoming the foregoing difficulties. Thus it has been proposed to carbonize the oil or oily impurity in the sulphur by subjecting the crude, oil-containing sulphur to the action of heat at relatively high temperatures and over a sufficiently long period of time to bring about the desired carbonization of the oil. Usually when this method is employed the carbonized material must be allowed to settle out from the molten sulphur in order to obtain a product of satisfactory color and purity for certain purposes. Still another method is to burn the oil-containing sulphur in special burners consisting of a plurality of superimposed trays or pans arranged in such a manner that the heat of combustion of the sulphur in each pan is readily communicated to the adjoining pan whereby the temperature of the sulphur is maintained at a sufficiently high range to prevent the formation of the oily film and thus promote rapid combustion. In still other instances it has hitherto been necessary to first refine the oil-containing sulphur by distillation or other suitable methods in order to obtain a satisfactory free-burning product.

As distinguished from these older methods, the present invention does not depend in any way upon the removal of the oil or upon the modification or prevention of the action of the oil upon the sulphur whereby the asphalty product is formed nor yet upon any method of purification or refining of the sulphur, but on the contrary the present invention is based upon the treatment of the oil-containing sulphur in such way as to reduce or modify or entirely overcome the film forming properties of this asphaltic or oily product, so that whilst this asphaltic material itself is allowed to form in the burning mixture, its film forming characteristics are so altered as to render it ineffective in excluding the air from the burning sulphur. This alteration of the film forming properties of the oily or asphaltic material is affected by the addition to the sulphur of a relatively small amount of certain organic chemicals before or during the combustion of the sulphur.

I have discovered that a material such as aniline, diphenylamine or similar aromatic amino compounds, as well as aromatic sulphur compounds or other organic materials capable of reacting directly with elementary sulphur to form organic sulphur compounds soluble in or readily miscible with molten sulphur, when incorporated with oil-containing sulphur either before or during the combustion thereof will have the remarkable effect of imparting free-burning qualities to the oil-containing sulphur so that the latter will burn almost as freely and easily as refined sulphur particularly when the treated sulphur is ignited at temperatures around 400° to 700° F. Among the organic compounds which can thus be used may be mentioned the following:

Benzidin
Tolidin
Acetanilide
alpha-naphthylamine
Thiocarbanilide
Xylidine
o-toluidine
Dimethylaniline
beta-naphthylamine
m-nitrodimetnylaniline
m-phenylenediamine
Propionanilide
Triphenylguanidine
Carbazol
Diphenylguanidine
Thiodiphenylamine
Phenol
Rescorcinol
Thiocresol
Thio beta naphthol
Benzyl sulphide
Diphenyldisulphide
Diphenylsulphone
p-nitrosodimethylaniline
Thioaniline When diphenylamine, for example, is added to liquid sulphur, in accordance with the present invention, it dissolves readily in the sulphur. When this treated sulphur after solidifying is ignited cold, that is, when a small portion of a relatively large mass is ignited, the oily or asphaltic scum does not form to the usual extent. However, at this lower temperature of ignition the improvement in the burning qualities as compared to that of the crude oil-containing sulphur is not nearly so apparent as it is at somewhat higher ignition temperatures. Thus, if the treated sulphur is first heated to about 400° to 500° F. before ignition the oily scum or asphaltic layer does not form over the surface of the molten sulphur while it is burning to any effective extent whatever and the sulphur burns quite freely and rapidly and the percentage of sulphur consumed is very greatly increased.

This optimum temperature of ignition, at which the improvement in the burning qualities of the oil-containing sulphur produced in accordance with my invention becomes most apparent, is ordinarily attained in almost any type of pan burner used in acid making and similar industrial operations after the burner is once warmed up. Furthermore, it is not necessary to heat the whole of the sulphur up to this optimum temperature before igniting it in order to get the best results in accordance with my invention, but it is preferred to heat enough of the sulphur up to this temperature to bring about the liberation of sufficient heat of combustion to pre-heat the remaining adjacent portions of the sulphur to this higher temperature.

An example will serve to illustrate this manner of applying my invention:

*Example 1.*

Place 10 grams of oily sulphur containing about 0.1% diphenylamine in a porcelain crucible in an oven heated to 270° F. After the crucible containing the sulphur has remained in the oven for a sufficient length of time to become heated a little below the temperature of the oven it is then transferred to a muffle furnace maintained at a dull red heat. The crucible is kept in the muffle for a few seconds until the thin film of sulphur around the edge of the crucible is heated to the ignition temperature (about 480° F.). The crucible is then immediately removed and placed upon a suitable support and protected from drafts, but in the meantime is left exposed to ordinary room temperature. As the sulphur, just ignited, is removed from the hot muffle it will be noted that only a very small portion of the sulphur around the sides of the crucible has reached a sufficiently high temperature to become viscous. The sulphur, in the center of the crucible, being still liquid., is therefore at a temperature somewhat lower than about 320° F. Yet this crude oily sulphur containing only a small fraction of a per cent of diphenylamine in accordance with the present invention will burn quite freely and completely when ignited at even this relatively low temperature.

It will be understood, of course, that the optimum ignition temperature varies somewhat according to the nature of the reagent added to the sulphur. Thus the effect of such organic compounds as aniline, tolidin, benzidin, acetanalid, alphanaphthylamine, etc. upon the formation of the oily film is not specially noticeable until the sulphur containing one or more of those compounds in relatively small proportion has been heated much hotter than in the example described above in which diphenylamine was added to the sulphur.

The optimum ignition temperature for sulphur containing aniline, tolidin, benzidin, acetanalid, alphanaphthylamine, etc. is approximately 500 to 700° F. but will vary somewhat according to the amount added, the nature and amount of other impurities present and other conditions.

While it is true that crude sulphur containing no added reagent burns somewhat better if ignited at this higher temperature than when ignited at a lower temperature, it is, nevertheless, also true that the presence of the addition reagent increases the burning qualities of the crude oily sulphur to a truly remarkable extent.

Instead of adding the reagent directly to the sulphur to be burned I may add the reagent to a small portion of sulphur, heat this mixture up to about the optimum ignition temperature referred to above and then add this heated mixture of sulphur and reagent to a larger mass of sulphur to impart free-burning qualities thereto. Thus, for example, when 4 parts of sulphur and 1 part of diphenylamine are heated together at a temperature of about 500° F. a red colored product, hereinafter frequently referred to as red sulphur, is formed. This red sulphur is considerably more effective in preventing the formation of the oily scum than diphenylamine itself. This red sulphur reacts at a much lower temperature than diphenylamine in imparting burning qualities to oily sulphur so that crude sulphur treated with this red sulphur (which I believe to be a mixture of thiodiphenylamine and other reaction products and sulphur) burns fairly well even when ignited cold. In other words, the optimum ignition temperature for sulphur treated with this diphenylamine-sulphur reaction product or red sulphur as the combustion-promoting reagent is lower than the optimum ignition temperature of sulphur treated with diphenylamine itself. Also smaller amounts of this red sulphur or reaction product are required to produce a free burning product when it is added to crude oil-containing sulphur, than is required to produce the same effect by means of diphenylamine itself. Thus, roughly, about 1 pound of diphenylamine per long ton of sulphur for each 0.01% of oil is required to produce a free burning product, whereas only so much red sulphur as is equivalent to about ½ lb. of the original diphenylamine is required to produce substantially the same effect when red sulphur or the reaction product of sulphur and diphenylamine is added to the oil-containing sulphur. The higher optimum ignition temperature of oily sulphur containing diphenylamine as compared to that of oily sulphur containing the reaction product or red sulphur is believed to be due to the fact that the reaction between diphenylamine and sulphur which results in the formation of the more effective reaction products does not take place effectively until the temperature has been raised to about 500° F. In other words it is believed that the action of diphenylamine in promoting the free burning of oil containing sulphur is due to the reaction of the diphenylamine with sulphur to form a reaction product which, in turn, reacts with the oil or with the oil and more sulphur in such a way as to greatly lessen or entirely destroy the film forming properties of the oil or asphaltic tar toward molten sulphur. The same is thought to be true of the action of the other reagents mentioned, that is to say, it is thought that the organic compounds themselves react with the sulphur at somewhat elevated temperatures to produce thio compounds and that these thio compounds or reaction products then, in turn, act upon the oil or oil and sulphur to lessen the film forming properties of the oil toward sulphur as just mentioned. It will be understood that the effect of the addition of the specified reagents to the sulphur is not ordinarily to completely destroy or eliminate the oily impurity, but rather to modify the film forming characteristics of the latter toward sulphur so that the film is no longer intact or no longer covers the entire surface of the molten sulphur, thus overcoming the blanketing effect whereby the oxygen of the air is excluded and the free burning qualities of the sulphur diminished or destroyed. However, in some instances the oily impurity or asphaltic tar seems to completely disappear as a result of the action of the added reagent and when this occurs it is thought that the oily impurity becomes completely incorporated with the main bulk of the sulphur as if by solution of the oil in the sulphur containing the reagent.

Of the amino compounds previously mentioned herein as suitable reagents, aniline is very much less expensive under ordinary conditions than the remaining amino compounds, but as has also been pointed out hereinbefore, when aniline is added directly to the bulk of the sulphur to be burned it does not affect the free burning qualities of the sulphur at as low a temperature as does diphenylamine. However, it has been found that the reaction product between a relatively small amount of sulphur and aniline is at least fully as effective as the red sulphur hereinbefore mentioned. Thus, when 4 parts of sulphur are heated with 1 part of aniline a reaction takes place between the aniline and the sulphur which becomes more pronounced at the boiling point of the aniline (about 360° F.) and as more and more of the aniline reacts the temperature of the mixture rapidly rises until at about 500° F. practically no aniline distills off from the mixture (i. e. no more aniline is returned from the reflux condenser). After the mixture has been heated up to about 500° F. the reaction product (which is semi-solid or plastic) is readily soluble in ordinary sulphur. This reaction product, which is, when cold, a chrome yellow plastic solid is frequently even more effective than red sulphur in imparting free burning qualities to crude oily sulphur.

This aspect of the invention will be further illustrated by the following examples:

*Example No. 1.*

A ten gram sample of crude sulphur containing 0.025% of oil was heated in a constant temperature oven to 260° F. The crucible containing the sulphur was removed to a fume-cupboard at room temperature.

A tiny spot on the surface of the liquid sulphur was ignited by means of a red hot wire and the sulphur allowed to burn as long as it would. The residue was weighed. An average of several tests showed that 44% of the sulphur had burned.

*Example No. 2.*

When the same crude sulphur was treated with the reaction product of sulphur and aniline in the proportion of 2.5 lbs. of the reaction product to one long ton of sulphur and burned under the same conditions in which the crude sulphur was burned it was found that 95% of the sulphur burned. When 10 lbs. per ton of the reaction product were added it was found that 98% of the sulphur burned.

In addition to the reagents previously mentioned herein comprising amines and their reaction products with sulphur I have found that certain other organic substances are effective in imparting free burning qualities to sulphur when incorporated therewith. Thus, for example, ordinary phenol will produce this effect. The optimum ignition temperature, however, when phenol is employed as the addition reagent, is somewhat higher than the optimum ignition temperature for sulphur containing diphenylamine or red sulphur or the reaction product of aniline and sulphur. The action of the phenol in imparting free burning qualities to the crude sulphur is thought to be due to the formation of a reaction product or thio compound resulting from the direct action of the sulphur upon phenol, this reaction product affecting the film forming properties of the oily impurities in much the same manner as does the red sulphur or reaction product of diphenylamine and refined sulphur Other organic compounds such as thiocresol, thionaphthol, benzyl sulphide, diphenyl disulphide and diphenylsulphone although they do not contain the nitrogen characteristic of the reaction products of sulphur and an amino compound are effective reagents inhibiting the formation of the oil scum when added in small amounts to liquid sulphur Of these compounds thiocresol is especially effective, being the equal of the aniline sulphur reaction product.

It will be understood that in preparing the various reaction products to be used as combustion promoting reagents, it is advisable to use refined sulphur instead of oil-containing sulphur in order to obtain a pure reaction product.

While the present invention is applicable to the burning of oily sulphur containing varying amounts of oil or oily impurities, nevertheless, somewhat better results are obtained when the invention is applied to sulphur containing not over about 0.05% of oily impurity for the reason that the residue left after burning is considerably less in such instances. Furthermore, it is advisable to keep the burners as hot as possible by rapid burning of the sulphur in order to reduce this residue to a minimum.

Also it will be understood that the organic reagent may be incorporated with the sulphur for the purpose of imparting free-burning characteristics thereto (in accordance with the present invention) in any convenient manner as by mixing the reagent in comminuted form with the comminuted sulphur if the former is in solid form or by spraying or sprinkling the sulphur with the reagent if a liquid organic reagent is employed. Also when convenient, the reagent may be added to the sulphur after ignition or while the sulphur is burning as by sprinkling or dusting the reagent over the surface of the ignited or burning sulphur while the latter is in either the liquid or the solid state. The preferred method of mixing, however, is to add the reagent to the sulphur while the latter is in a molten state.

The reagents may be added to the sulphur at any time before it is burned. In case the liquid sulphur is afterwards to be solidified and marketed in competition with oily crude sulphur such a reagent or compound should be chosen that will have no noticeable objectionable physical effect on the solidified sulphur. If the compound or reagent to be added to the liquid crude sulphur is fed to the sulphur burner the physical properties of the sulphur are in this instance of no particular importance, depending upon the temperature to which the sulphur is to be heated before burning, one of several reagents or mixtures may be added to produce effective results.

While it is not desired to restrict the scope of the present invention by any unwarranted assumptions as to the exact chemical nature of the reaction of the reagent such as amine upon sulphur to produce the product which is most effective in combining with or otherwise affecting the film forming properties of oil, nevertheless in the case of diphenylamine it seems probable that thiazine, thiodiphenylamine is present in the reaction product formed by heating diphenylamine and refined sulphur and is the effective compound or reagent. In the case of aniline it is thought that thioanilines are formed. However, it will be understood that it is not necessary in the practice of my invention to use these pure organic thio compounds as the reagent, but, as previously mentioned, the reaction products resulting from the heating together of the amines, and other organic compounds mentioned, with relatively small amounts of sulphur are quite effective in imparting free burning qualities to the sulphur. In many instances a more or less definite temperature exists for each particular organic sulphur free compound at which the most suitable reaction product of the compound and sulphur is formed. As a general rule all such reaction products are formed at temperatures under the boiling point of sulphur. The amount of refined sulphur required for preparing these reaction products or mixtures will vary somewhat, but in many instances a mixture of 4 parts of refined sulphur to 1 part of the sulphur free amine or other suitable compound will give good results. However, the proportions of sulphur and the amine or similar compound may be varied within quite wide limits.

In order that the amine or other suitable organic compound or the reaction product of the compound with refined sulphur may dissolve in or mix intimately with the crude sulphur treated, it is desirable that it have a melting point lower than the temperature of the liquid sulphur treated. However, compounds melting at temperatures higher than that of the liquid sulphur treated may be used by mixing a relatively large amount of the compound with small amounts of another compound of lower melting point to form a mixture or solution which can be mixed with or dissolved in the liquid crude sulphur in a satisfactory manner.

As previously mentioned these compounds can be added to the sulphur at any time before it is burned, or even in some instances while it is burning. In case the liquid sulphur is to be treated with the reagent and is afterwards to be solidified and marketed in competition with low oily crude sulphur such a compound should be chosen that will have no noticeable objectionable physical effect on the solidified sulphur, as for example an objectionable discoloration.

It will be understood that while the principal advantage of the present invention in connection with sulphur burning is the overcoming or lessening of the film forming properties of the oily impurities during the first stages of the combustion, it is also true that another important advantage of the invention is that the oil film in some instances is either not formed at all or is not formed until a much larger percentage of the sulphur has been burned than would have burned had the sulphur not been so treated.

In some instances the product of the reaction of the reagent with the sulphur is a tarry substance which entrains sulphur mechanically. When treated sulphur is burned this tar is concentrated in the sulphur yet unburned and when this effect is pronounced it may sometimes be desirable to adjust the burner in such a way that this tarry product does not interfere with the complete combustion of the sulphur.

I claim:
1. As a new composition of matter a product consisting principally of sulphur and containing also an organic compound soluble in molten sulphur.

2. As a new composition of matter a product consisting principally of sulphur, and containing also an organic compound capable of acting directly upon free elementary sulphur to form an organic-sulphur compound soluble in molten sulphur.

3. As a new composition of matter a product consisting principally of sulphur and containing a relatively small proportion of oil and including also an organic substance capable of altering the film forming properties of the oil toward hot molten sulphur in such manner that the oily film or coating which in the absence of the organic substance forms over the surface of the hot molten sulphur is disintegrated sufficiently to allow access of sufficient air to promote the burning of the sulphur when ignited.

4. As a new composition of matter a product consisting principally of sulphur and containing also an organic amino compound.

5. As a new composition of matter a product consisting principally of sulphur and containing also an aromatic amino compound.

6. As a new composition of matter a product consisting principally of sulphur and containing also aniline.

7. The method of treating oil-containing sulphur to impart free burning qualities thereto which comprises subjecting the oily sulphur to the action of an organic substance capable of reacting with the molten sulphur to form an organic sulphur compound soluble in the molten sulphur.

8. The method of treating oil-containing sulphur to impart free burning qualities thereto which comprises subjecting the oil-containing sulphur to the action of an organic reagent soluble in the molten sulphur and capable of breaking up the oily film which forms over the surface of the sulphur when the oil-containing sulphur is melted.

9. The method of treating oil-containing sulphur to impart free burning qualities thereto which comprises subjecting the oil-containing sulphur to the action of an organic substance capable of reacting directly with the sulphur to form a product which is soluble in molten sulphur and which is also capable of breaking up the oily film formed over the surface of the sulphur when the oil-containing sulphur is melted.

10. The method of treating oil-containing sulphur to impart free burning qualities thereto which comprises subjecting the oil-containing sulphur to the action of an organic amino compound.

11. The method of treating oil-containing sulphur to impart free burning qualities thereto which comprises subjecting the oil-containing sulphur to the action of an aromatic amino compound.

12. The method of treating oil-containing sulphur to impart free burning qualities thereto which comprises subjecting the oil-containing sulphur to the action of a thio-amino organic compound.

13. The method of treating oil-containing sulphur to impart free burning qualities thereto which comprises subjecting the oil-containing sulphur to the action of an aromatic thioamino compound.

14. The method of treating oil-containing sulphur to impart free burning qualities thereto which comprises subjecting the oil-containing sulphur to the action of aniline.

15. The method of treating oil-containing sulphur to impart free burning qualities thereto which comprises subjecting the oil-containing sulphur to the action of a product resulting from the direct action of aniline upon sulphur at relatively high temperatures.

16. The method of treating oil-containing sulphur to impart free burning qualities thereto which comprises subjecting the oil-containing sulphur to the action of a product resulting from the direct action of aniline upon sulphur.

17. The method of treating oil-containing sulphur to impart free burning qualities thereto which comprises subjecting the oil-containing sulphur to the action of an organic sulphur containing compound.

18. The method of treating oil-containing sulphur to impart free burning qualities thereto which comprises subjecting the oil-containing sulphur to the action of an aromatic sulfide.

In testimony whereof I affix my signature.

JAMES W. SCHWAB.